Oct. 28, 1947.                  E. LABIN ET AL                    2,429,631
                     MULTICHANNEL PULSE MODULATOR SYSTEM
                       Filed April 30, 1945        2 Sheets-Sheet 2
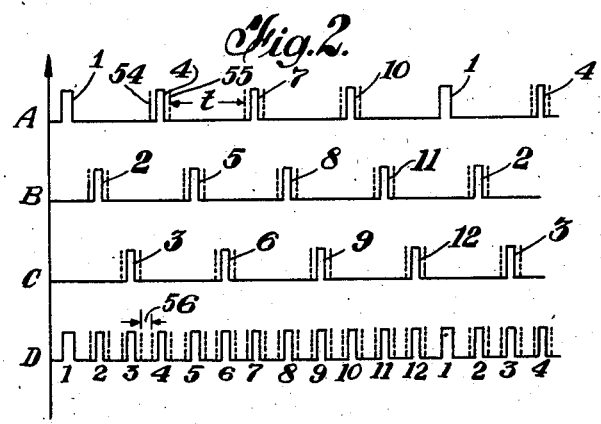
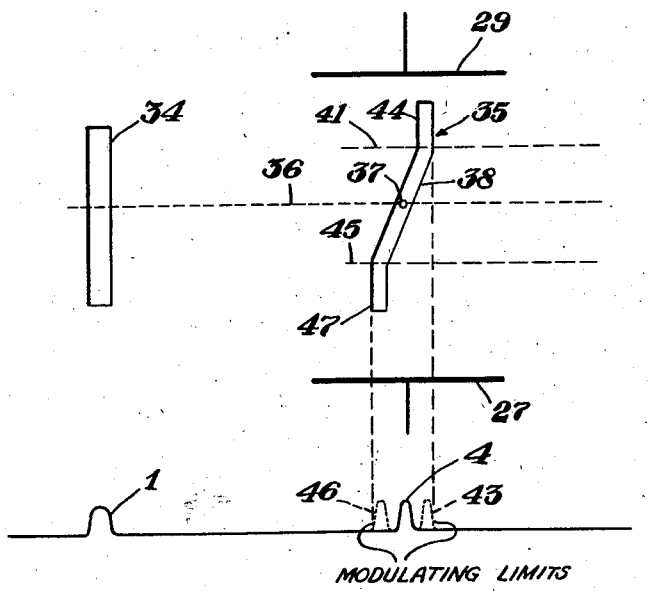
INVENTORS
EMILE LABIN
DONALD D. GRIEG
BY
ATTORNEY Patented Oct. 28, 1947

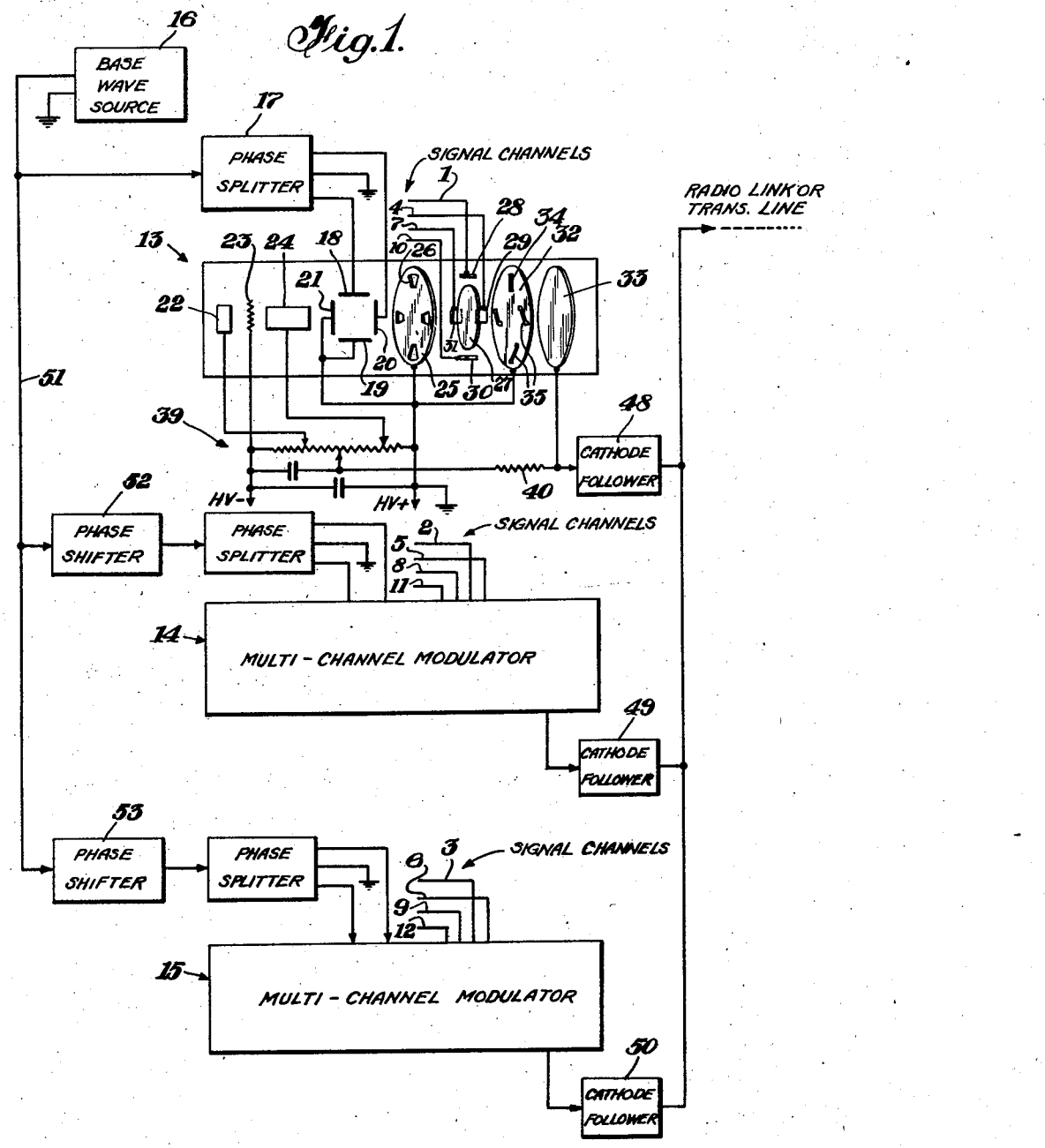

2,429,631

UNITED STATES PATENT OFFICE 2,429,631

MULTICHANNEL PULSE MODULATOR SYSTEM

Emile Labin, New York, and Donald D. Grieg, Forest Hills, N. Y., assignors to Federal Telephone and Radio Corporation, New York, N. Y., a corporation of Delaware Application April 30, 1945, Serial No. 591,065

8 Claims. (Cl. 179—15)

This invention relates to multi-channel communication systems and more particularly to multi-channel systems employing a plurality of series of pulses wherein each series represents a signalling channel and the pulses of the different series are interleaved into a single train of pulses for transmission.

In our copending application for Signal transmitting systems, Serial No. 567,414, filed December 9, 1944, which is assigned to Federal Telephone and Radio Corporation, we disclose a multi-channel pulse modulator in the form of an electron beam commutator tube. This modulator employs a cathode ray or electron beam producing structure and means to cause the beam to sweep through a given movement for coaction with a plurality of modulator electrodes or units and a target electrode arrangement to produce a plurality of series of signal modulated pulses. Each modulator unit is provided with a signal input whereby the beam is deflected or otherwise modified during the sweep movement within the zone of the unit so that the electrons thereof produce modulated pulse current in the electrode target disposed beyond the modulator units. The modulator unit and target relationship is preferably that which produces a time displacement in the output pulse corresponding to the instantaneous values of the modulating signals. Insofar as the present invention is concerned, however, the modulation may be time or amplitude modulation of the pulses or modulation of some other characteristic of the pulses.

According to the multi-channel beam modulators of our aforementioned application, a large number of channels may be provided for each modulator by providing a long sweep path for the electron beam and to locate the beam modulating units along the sweep path. The modulating units, however, must not be located so close to each other as to cause interference between them.

It is an object of this invention to provide a multi-channel modulator system utilizing a plurality of modulator tubes each having a much smaller number of modulator units than the number of channels desired.

One of the features of the invention is to provide a plurality of beam modulator tubes of small size with a limited number of modulator units per tube, the units being spaced apart a distance sufficient to avoid "cross talk interference" or other operation distortion.

A further feature of the invention is to provide means for synchronizing the operation of the modulator tubes, the beams of the tube being phased in their sweep movement so that the output pulses of the different tubes occur at different timing in order that they may interleave together into a single train of pulses for transmission.

The above and other objects and features of the invention will become better understood upon consideration of the following detailed description and the accompanying drawings in which:

Fig. 1 is a diagrammatical illustration of a multi-channel pulse modulator system according to the principles of this invention;

Fig. 2 is a graphical representation of the signal pulses produced by the modulators of the system shown in Fig. 1; and Fig. 3 is a graphical representation of the time modulating operation of one of the modulators.

Referring to Figs. 1 and 2 of the drawings, a multi-channel pulse time modulating system is shown for twelve signalling channels, 1 to 12, wherein the pulses of channel 1 are distinguished in width for synchronizing purposes. The pulses shown in Fig. 2 are numbered according to the signalling channels of Fig. 1. As shown in Fig. 1, three multi-channel modulators 13, 14 and 15 of the type shown in our aforesaid application are included, although it will be understood that a lesser or greater number may be employed depending upon the number of signalling channels to be provided and also the number of signalling channels each modulator may handle. As indicated by way of example, four channels are provided for each modulator although a much greater number may be employed in actual practice.

The pulse output of modulator 13 is represented by graph A of Fig. 2, and the pulse outputs of modulators 14 and 15 are represented by the pulses of graphs B and C. The timing of the pulses of the different modulators is such that the pulses of the different modulators occur in sequence and interleave together as indicated in graph D.

The synchronization of the modulators 13, 14 and 15 is controlled from a base wave source 16 which may be any known type of stable oscillator. The wave output of the source 16 is applied to a phase splitter 17 whereby two waves separated in phase by 90° are applied to two pairs of deflection plates 18, 19 and 20, 21 to control the sweep movement of a beam produced by the usual cathode ray producing and focusing elements 22, 23 and 24. While the deflection plates 18, 19 and 20, 21 which are disposed in a horizontal and vertical (x-axis and y-axis) arrangement so as to deflect the electron beam in a circular sweep movement, it will be clear that other beam deflecting constructions may be employed utilizing different sweep potentials for producing any sweep pattern desired.

The circular sweep movement of the beam is caused to traverse a commutator plate 25 which is provided with a series of apertures 26 arranged in a circular manner to divide the beam into segments during its sweep movement. To effect signal deflection of the beam segments a circular electrode 27 is provided with a series of small electrodes 28, 29, 30 and 31 disposed about the peripheral edge of the electrode 27. The electrodes 28 to 31 are arranged so that the corresponding beam segments passed by apertures 26 of commutator plate 25 occur between them and the central electrode 27. The signal is applied to the small electrodes as indicated by the signal input circuits 1, 4, 7 and 10.

The electrode target system of the modulator with which the electrons cooperate to produce pulse current comprises a modulator plate 32 and a secondary electron emission electrode 33. The plate 32 is provided with narrow slots 34 and 35, the slot 34 being shaped to produce a wider pulse than slots 35 for use as synchronizing pulses at the receiver. The other slots 35 are especially shaped (see Fig. 3) with the central portion of each slot disposed at an acute angle with respect to the direction of the signal deflecting potentials produced between the small signal deflection plates 29, 30 and 31 and the central electrode 27. The end portion of these slots, however, are disposed parallel to the direction of signal deflection.

Referring particularly to Fig. 3, the dotted line 36 represents the sweep path of the beam 37 in the absence of signal modulation. It will be noted that this path traverses the center of the central portion 38 of the slot 35. The beam for this normal sweep movement causes secondary emission of electrons from plate 33 which is maintained at a lower potential than plate 32 as is clear from the voltage supply circuit 39, Fig. 1, thereby producing a pulse flow of current through resistor 40 such as indicated at 41, Fig. 3.

Assume now that a signal occurs on electrode 29 of a positive value such as to cause a deflection of the beam 37 to the path indicated at 41. This will produce a pulse flow displaced from the pulse timing at 41 such as indicated at 43. The vertically extended portion 44 of the slot 35 is provided to limit the time displacement of the pulse output should especially large signal values occur. The output pulse such as indicated at 43 will occur for any displacement of the beam along the length of portion 44. If the slot 35 were terminated at the end of the central portion 38 no output pulse would be obtained for a signal causing deflection beyond such end.

For a negative swing of signal on electrode 29, the beam 37 is shifted to a path below the path 36. Such a negative swing may be represented by the path 45, the corresponding output pulse being represented at 46. The vertical portion 47 of the slot 35 provides a maximum negative displacement limit for the pulse similarly as in the case of vertical end portion 44.

The slot 34 for the synchronizing channel 1 is also shown in Fig. 3. While the slot 34 is shown to be a vertical slot, it may take the form of a small square or other suitably shaped opening since for the synchronizing channel no deflective potential need be provided. The slot 34, however, is preferably elongated to compensate for any offset bias that may be imposed upon the system, such for example as by controlling the amplitude of the deflecting waves supplied to electrodes 18, 19 and 20, 21.

The output of the electrode combination 32, 33 is applied to a cathode follower 48, the output of which is combined with the outputs of the cathode followers 49 and 50 with modulators 14 and 15, whereby the pulse outputs of the three modulators interleave to form a single train of pulses as indicated in graph D of Fig. 2. The train of pulses thus produced may be applied to the usual carrier frequency modulator for transmission over a radio link or the pulses may be applied through a suitable impedance matching network in connection with a transmission line.

The modulators 13, 14 and 15 are controlled to synchronize the three series of pulse outputs thereof for interleaving in the relation shown in the graphs of Fig. 2 by applying the base wave from source 16 over connection 51 to phase shifters 52 and 53. By adjusting the phase shifters 52 and 53 so as to vary the sweep positions of the beams of modulators 14 and 15 for different phase relations with respect to the electron beam movement in modulator 13, the output pulses of modulators 14 and 15 may be staggered in the manner shown in graphs B and C with respect to the pulses of graph A. It will be understood of course that the limits of time modulation such as indicated at 54 and 55 for channel 4, Figs. 2 and 3, for example, do not overlap with the displacement limits of adjacent pulses, but have a guard interval 56 therebetween as indicated in graph D.

The guard interval $t$ occurring between adjacent pulses of two adjacent slots 35 in the modulator plate 32 is much greater than in the final train of pulses for transmission. This insures against interference between one beam segment and the next during the modulation operation within a single tube. This is of particular advantage in multi-channel operation since to produce a train of pulses modulated according to different signals in a minimum time interval by use of a single beam may introduce cross-talk between adjacent modulator zones. This may be caused by placing the zones or deflecting plate units 29 to 31 so close together that displacement of the beam in one zone may carry over into the next zone and thereby produce cross-talk or distortion in the subsequent channel.

This carry over or cross-talk interference is substantially entirely eliminated in our modulator system by spacing the modulator zones or deflection units of the modulator tube a distance apart such that the beam will return to a stable condition following each deflection zone before entering the next succeeding deflection zone. It will be clear from the foregoing that by not crowding the modulator zones of a tube in order to multiply the number of channels, we avoid introducing cross-talk or other operating distortion. Thus, by limiting each modulator tube to a number of modulating zones such that there will be no carry over of beam deflection from one zone to the next, and by using a number of such modulator tubes properly phased in their operation, the output pulses thereof are interleaved in close time relationship into a single train of pulses with substantially no cross-talk interference between adjacent channels.

While we have shown and described our invention in connection with a special form of multi-channel modulator tube, it will be understood that other forms of modulator tubes of the commutator type such as disclosed in our aforesaid application, for example, may be substituted without departing from the invention. It should be understood, therefore, that the particular example shown is given by way of illustration of the invention only and not as a limitation on the scope of the invention as set forth in the objects and the appended claims.

We claim:

1. A multi-channel modulator system comprising a plurality of modulators each including means for producing a plurality of separate series of signal modulated pulses, each series representing a different signalling channel, and means for controlling said modulators to space the adjacent channels in each modulator a relatively wide interval while maintaining relatively close spacing of channels in adjacent modulators.

2. A multi-channel modulator system comprising a plurality of modulators each including means for producing a plurality of separate series of signal modulated pulses, each series representing a different signalling channel, and means for synchronizing said modulators to interleave the output pulses thereof into a single train of pulses.

3. A multi-channel modulator system comprising a plurality of modulators each including a plurality of separate signal controlled means for producing separate series of signal modulated pulses, means for preventing interference between the signal controlled means of each modulator, and means for synchronizing said modulators to interleave the output pulses thereof into a single train of pulses.

4. A multi-channel modulator system comprising a plurality of electron beam producing means, control means for controlling each beam to produce a plurality of separate series of output pulses, means to modulate the pulses of each series according to signal energy, and means for synchronizing said control means to interleave the pulses of the different series into a single train of pulses.

5. A multi-channel modulator system comprising a plurality of modulators each including means to produce a beam of electrons, means to cause the beam to have a given sweep movement, a plurality of signal channel input circuits, means associated with said input circuits to control deflection of the beam successively in its sweep movement according to instantaneous values of the input signals of said circuits, means to produce a pulse of energy during each signal deflection of said beam, and means to control the movement of the electron beam of each modulator to interleave the output pulses thereof into a single train of pulses.

6. A multi-channel modulator system comprising a plurality of modulators each including means to produce a beam of electrons, means to cause the beam to have a given sweep movement, a plurality of signal channel input circuits, means associated with said input circuits to control deflection of the beam successively according to the input signals of said circuits, means coacting with said beam at given zones spaced apart along the sweep path of said beam to produce pulses of energy modulated according to signal deflections of said beam, and means to control the movement of the electron beam of each modulator in a manner to interleave the output pulses thereof into a single train of pulses.

7. A multi-channel modulator system comprising a plurality of modulators each including means to produce a beam of electrons, means to cause the beam to have a given sweep movement, a plurality of signal channel input circuits, means associated with said input circuits to control deflection of the beam successively at given zones in its sweep movement according to instantaneous values of the input signals of said circuits, said given zones being spaced apart an amount sufficient to avoid interference between adjacent zones, electrode means to produce pulses of energy modulated according to the corresponding signal deflections of said beam, and means for synchronizing said modulators in a manner to interleave the output pulses thereof into a single train of pulses.

8. A multi-channel modulator system comprising a plurality of modulators each including means to produce a beam of electrons, means to cause the beam to have a given sweep movement, a plurality of signal channel input circuits, means associated with said input circuits to control deflection of the beam successively and at widely spaced zones in its sweep movement according to instantaneous values of the input signals of said circuits, electrode means to produce pulses of energy time modulated according to the corresponding signal deflections of said beam, means for producing a base wave, means for applying energy of said wave in different phase relationship to said modulators to control the movement of the electron beam of each modulator and thereby cause the output pulses of the modulators to interleave into a single train of pulses.

EMILE LABIN.
DONALD D. GRIEG.

REFERENCES CITED

The following references are of record in the file of this patent:

UNITED STATES PATENTS

| Number | Name | Date |
|---|---|---|
| 2,172,354 | Blumlein | Sept. 12, 1939 |
| 2,328,944 | Beatty | Sept. 7, 1943 |